United States Patent [19]

Karube

[11] Patent Number: 5,604,726

[45] Date of Patent: Feb. 18, 1997

[54] PRE-FORMAT CONFIGURATION OF OPTICAL DISKS AND METHOD OF DATA PROCESSING USING THE SAME

[75] Inventor: Hiroo Karube, Tokyo, Japan

[73] Assignee: NEC Corporation, Japan

[21] Appl. No.: 539,769

[22] Filed: Oct. 5, 1995

[30] Foreign Application Priority Data

Oct. 7, 1994 [JP] Japan .................................. 6-244208

[51] Int. Cl.[6] ..................................................... G11B 7/24
[52] U.S. Cl. ..................................... 369/275.4; 369/275.1
[58] Field of Search ............................. 369/275.4, 275.2, 369/275.1, 277, 279, 292; 430/320, 321

[56] References Cited

U.S. PATENT DOCUMENTS

| | | | |
|---|---|---|---|
| 5,407,720 | 4/1995 | Omata | 369/275.4 |
| 5,422,874 | 6/1995 | Birukawa et al. | 369/275.4 |
| 5,477,524 | 12/1995 | Deguchi et al. | 369/275.4 |
| 5,477,526 | 12/1995 | Inoue | 369/275.4 |

FOREIGN PATENT DOCUMENTS

| | | |
|---|---|---|
| 63-255846 | 10/1988 | Japan . |
| 1-165052 | 6/1989 | Japan . |
| 4-23240 | 1/1992 | Japan . |

*Primary Examiner*—Tan Dinh
*Attorney, Agent, or Firm*—Hayes, Soloway, Hennessey, Grossman & Hage, P.C.

[57] ABSTRACT

The optical disk disclosed has optical memory systems for data recording and reproduction, and includes a plurality of grooves, a plurality of lands, and a plurality of pre-bits. The grooves extend circumferentially of the optical disk, and the lands are defined by the grooves. The pre-pits are formed in the lands such that portions of an inner periphery side or an outer periphery side of each of the lands are cut out so as to provide such pre-pits. When reading out data on the land, pre-pit data produced thereon is used directly, and when reading out data in the grooves, data detected by crosstalk from pre-pits produced on the lands is used. The problem that it is difficult to form the pre-pits both on the lands and on the grooves has been overcome.

3 Claims, 2 Drawing Sheets

PRE-FORMAT CONFIGURATION OF OPTICAL DISKS AND METHOD OF DATA PROCESSING USING THE SAME

BACKGROUND OF THE INVENTION (1) Field of the Invention

The present invention relates to optical memory systems for optical data recording and reproduction, and more particularly to a pre-format configuration of optical disks and a method of data processing using the same.

(2) Description of the Related Art

In a prior art optical disk, as shown in FIG. 1, a transparent substrate 1 of PMMA (polymethyl methacrylate), PC (polycarbonate), etc. has grooves 2 which are formed concentrically or spirally and which define lands 3. On the lands 3, pre-pits 4 are provided, which correspond to track number data. Each land 3 forms a track, and it consists of a recording section 10 for writing data therein and a pre-format section 20 in which pre-pits 4 are formed in advance in correspondence to track number data.

When writing data on the optical disk, each land is tracked with a light spot to read out address data or the like represented by pre-pits 4 in the pre-format section 20 and then to write data in the recording section 10. When reading out data, each land 3 is tracked with the light spot 5 to read out address data or the like represented by pre-pits 4 in the pre-format section 20 and then read out data that has been written in the recording section 10.

There is great demand for increasing optical disk capacity, and there have been made extensive technical developments of wavelength reduction and track pitch reduction for recording and reproduction. In one technique of increasing the recording capacity of the optical disk, data is recorded in both lands and grooves. This technique is called a land/groove recording/reproducing technique. As described above, for recording and reading data, it is necessary to read out address data or the like that has been written in advance as pre-pits. To this end, it is necessary to form pre-pits in both the lands and the grooves.

Optical disks are roughly classified into two types depending on the position in which the pre-format section is formed. One of these types is a land type, in which pre-format sections are formed on lands of the optical disk. The other type is a groove type, in which pre-format sections are formed in grooves of the optical disk. In the pre-format section, the pre-pits are formed in a raised or recessed form.

As the process of forming the lands, grooves and pre-pits, an injecting molding process, a photopolymer (2P) process and a process of etching a glass or glass like substrate by using a mask disk, have been proposed. In the injecting molding process or the 2P process, a master disk is used. For preparing a master disk, an etching process using a mask disk is again essential. While it is necessary to form pre-pits in both the lands and the grooves for recording and reading data in the land/groove recording/reproducing technique, it is very difficult to form pre-pits in both the lands and the grooves.

SUMMARY OF THE INVENTION

An object of the invention is to provide, by using an optical disk with pre-pits formed such that portions of the inner periphery side or the outer periphery side of lands are cut out, an optical disk in which pre-pits are formed both on the lands and the grooves and in which pre-pit data produced on the lands is used directly when reading out land data, and data detected by crosstalk from pre-pits formed on the lands is used when reading out groove data.

Another object of the invention is to provide an optical disk in which, when reading out data corresponding to the address of each sector in a pre-format section (i.e., ID data), distinguishment is made as to whether data is being read out from lands or grooves, and further independent ID management of lands and grooves is made, so that it is possible to solve the problem of overlap of ID data in lands and grooves.

According to one aspect of the invention, there is provided an optical disk having optical memory systems for data recording and reproduction, comprising:

a plurality of grooves extending circumferentially of the optical disk;

a plurality of lands defined by the grooves and having recorded data; and a plurality of pre-pits which have track number data and which are formed in the lands such that portions of the inner periphery side or the outer periphery side of the lands are cut out so as to provide the pre-pits.

In the case of an optical disk whose land has a usual pre-format section, even when an attempt is made to read out data in a pre-format section in the land as crosstalk from the land by illuminating the groove with light, it is difficult to process the data subsequently because the amount of crosstalk from the pre-format section of the land is too small. A case is now considered when a groove of an optical disk with pre-pits formed by cutting out portions of the land is scanned with a light spot. Since the pre-pits exist extending up to the boundary between the land and the groove, the crosstalk from the pre-pits formed on the land is greater than the case when the usual optical disk is used. Thus, the crosstalk on the groove from the pre-format section of the land has sufficiently high intensity for subsequent data processing. In this case, if the pre-pits have a configuration such that portions of the land on both the inner periphery side and the outer periphery side are cut out, crosstalk signals from the lands on the opposite sides of the groove interfere with each other resulting in disturbance of data. To prevent such interference, it is necessary to form pre-pits by cutting out either the inner periphery side or the outer periphery side of the land.

The pre-format section has data corresponding to the address of each sector (i.e., ID data). According to the invention, as ID data of the groove, the same data as ID data of the land is used, and this results in overlap of the ID number in the land and the groove. Therefore, inconvenience arises if ordinary processing is to be carried out. Accordingly, when reading out ID data, it is distinguished whether the data being read out is from the land or the groove, and further independent ID management of lands and grooves is made. In this way, it is possible to solve the problem of the overlap of ID number in the land and the groove.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

An embodiment of the invention will now be described with reference to the drawings.

First, a method of manufacturing an optical disk embodying the invention will be described. A glass master disk uniformly coated with a photo-resist to a thickness of 90 nm is rotated at 600 rpm and, for exposure, an argon laser beam spot is irradiated on portions of the photo-resist where it is desired to form grooves and pre-pits. Then, this glass master disk is developed. Thereafter, by using this glass master disk as a die, a nickel stamper is produced. Using this nickel stamper, a transparent substrate for the optical disk of polycarbonate (PC) is produced by injection molding. It is possible to use amorphous polyolefin type resin in lieu of PC.

Figure 1:
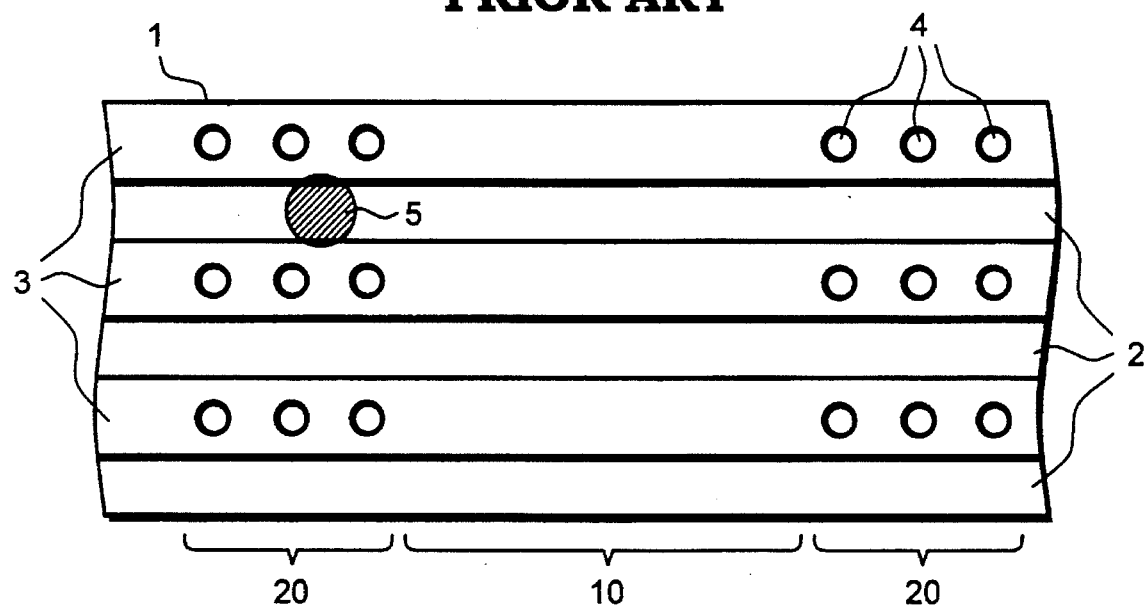
FIG. 1 is a top view showing a prior art optical disk substrate.
Figure 2:
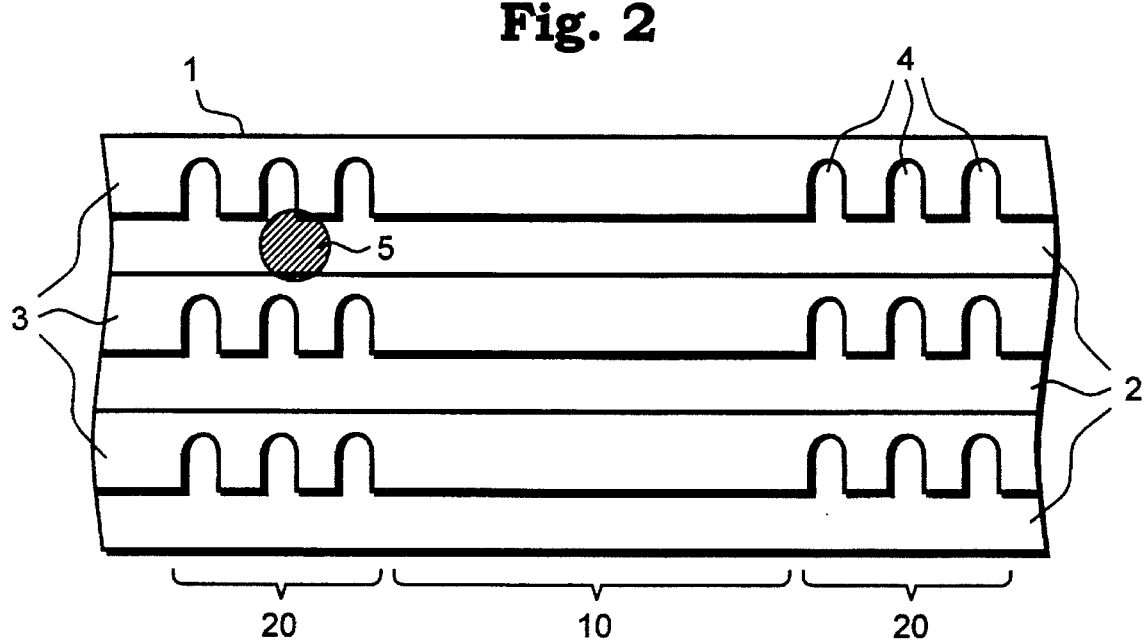
FIG. 2 is a top view showing an optical disk substrate according to the invention.

FIG. 2 is a top view showing the substrate of an optical disk according to the invention. The substrate 1 is transparent and made of PC, and it has grooves 2 and lands 3 concentrically or spirally. The lands 3 are provided with pre-pits 4 corresponding to track number data. Each land 3 forms a track and has a recording section 10 and a pre-format section 20 in which pre-pits 4 corresponding to track number data are formed in advance. Each pre-pit 4 extends towards the inner periphery of the disk and reaches the area of groove 2. On the other hand, the pre-pit 4 has an adequate size on the outer periphery side and does not extend beyond the land 3 to reach the groove 2. Thus, only the portions of the inner periphery side of the land 3 are cut out thereby providing the pre-pits 4. This means that no change results in the effect from the cutting out of only the portions of the outer periphery side of the land 3 to provide the pre-pits 4. The pre-pits 4 may be in any shapes such as circular, elliptical, square, rectangular, triangle, etc.

Generally, when writing data on the optical disk, the land 3 is tracked with the light spot 5 to read out address data having been formed by pre-pits 4 in the pre-format section 20, and then data is written in the recording section 10. Likewise, when reading out data, the land 3 is tracked by the light spot 5 to read out address data or the like having been formed by pre-pits 4 in the pre-format section 20 and then read out data having been written in the recording section 10.

Figure 3:
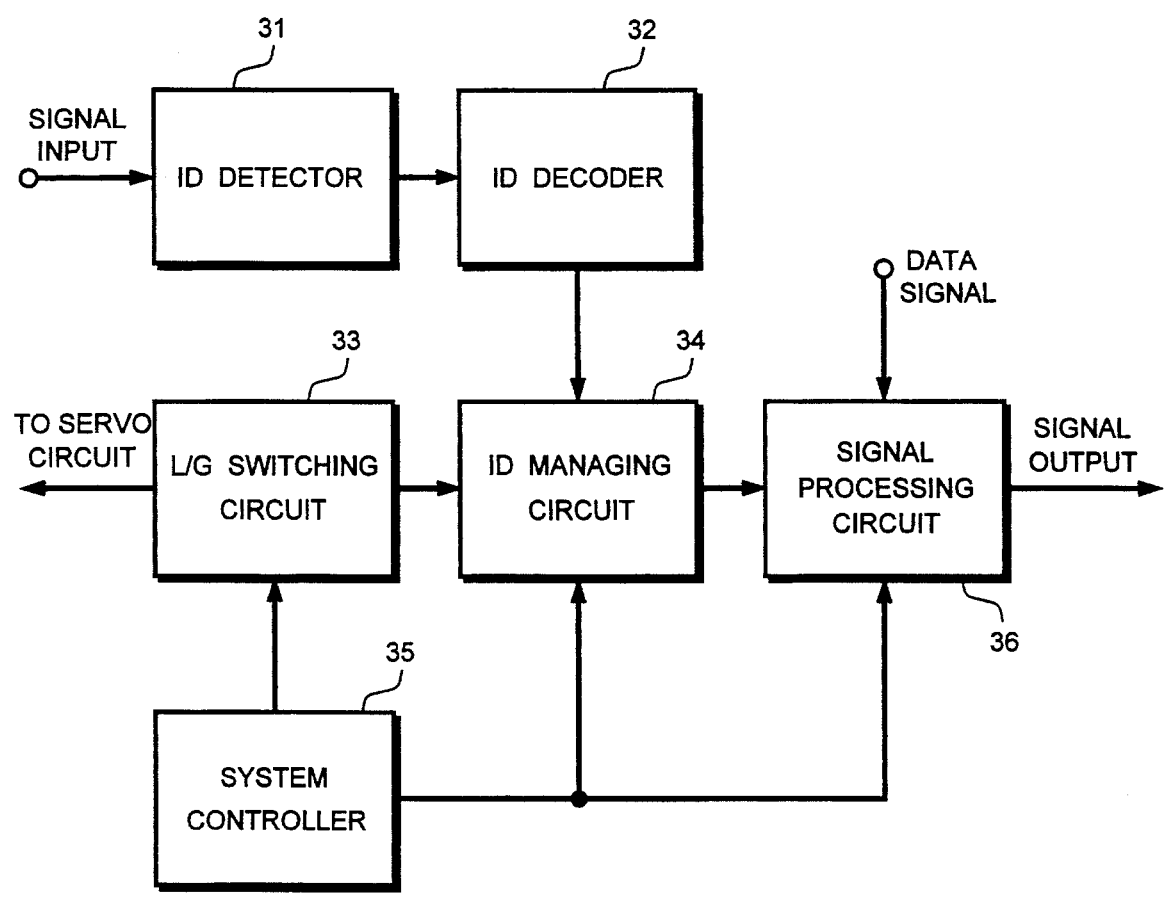
FIG. 3 is a block diagram showing a circuit according to the invention, in which, for reading out ID data, it is distinguished whether data is being read out from a land or a groove, and which makes independent ID management of lands and grooves.

FIG. 3 is a block diagram showing a circuit according to the invention which, when reading out ID data, executes distinguishment as to whether data being read out is from a land or a groove, and also makes independent ID management of lands and grooves.

The circuit comprises an ID detector 31 for detecting ID data from a signal from the disk, an L/G switching circuit 33 for switching the land and the groove over to one another according to a command from a system controller 35, an ID managing circuit 34 for adding discriminating data for discriminating the land and the groove from one another to ID data from an ID decoder 32 according to data from the L/G switching circuit 33 under control of a command from the system controller 35, and a signal processing circuit 36 for processing data according to ID data sent out from the ID managing circuit 34.

Signal from the disk is passed through the ID detector 31 to become the sole ID data to be decoded by the ID decoder 32. The ID managing circuit 34 adds discriminating data for discriminating the land and the groove from each other to ID data from the ID decoder 32 according to data from the L/G switching circuit 33 under control of a command from the system controller 35, the resultant data being sent to the signal processing circuit 36. The signal processing circuit 36 processes data signal according to ID data from the ID managing circuit 34. At this time, the ID managing circuit 34 makes distinguishment from the land/groove discriminating data as to whether data from the land or the groove is being read out.

As has been described in the foregoing, with the optical disk substrate according to the invention, by using an optical disk with pre-pits formed by cutting out portions of the inner or outer periphery of the land, the pre-pit data thereon is used directly when reading out land data, and the data detected by crosstalk from pre-pits formed on the land is used when reading out groove data. It is thus possible to solve the problem that it is very difficult to form pre-pits on both the lands and grooves.

While the invention has been described in its preferred embodiment, it is to be understood that the words which have been used are words of description rather than limitation and that changes within the purview of the appended claims may be made without departing from the true scope of the invention as defined by the claims.

What is claimed is:

1. An optical disk having optical memory systems for data recording and reproduction, comprising;
    a plurality of grooves extending circumferentially of the optical disk;
    a plurality of lands defined by said grooves and having recorded data; and
    a plurality of pre-pits which have track number data and which are formed in said lands such that portions of a periphery side of each of said lands are cut out so as to provide said pre-pits.

2. A method of data processing by using an optical disk having a plurality of grooves extending circumferentially of the optical disk, a plurality of lands defined by said grooves and having recorded data, and a plurality of pre-pits which have track number data and which are formed in said lands such that portions of a periphery side of each of said lands are cut out so as to provide said pre-pits, said method comprising the steps of detecting the ID data from the output signal from the optical disk; decoding the ID data from the detected ID data; adding a discriminating signal to said decoded ID data; distinguishing whether the data from said lands or said grooves are being read out; processing the distinguished data and out put as an output signal data, using pre-pit data on said lands directly when reading out land data, and using data detected by crosstalk from said pre-pits when reading out groove data.

3. The method of data processing according to claim 2, in which, when reading out ID data, distinguishment between said lands and said grooves is made, and ID management of said lands and said grooves is made independently.

* * * * *